(12) United States Patent
Glueckler

(10) Patent No.: US 9,403,428 B2
(45) Date of Patent: Aug. 2, 2016

(54) TRACTION SUPPORTED MULTI GROUP TRANSMISSION

(71) Applicant: ZF Friedrichshafen AG, Friedrichshafen (DE)

(72) Inventor: Johannes Glueckler, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 397 days.

(21) Appl. No.: 14/065,551

(22) Filed: Oct. 29, 2013

(65) Prior Publication Data

US 2014/0144288 A1 May 29, 2014

(30) Foreign Application Priority Data

Nov. 29, 2012 (DE) .......................... 10 2012 221 889

(51) Int. Cl.
*B60K 6/36* (2007.10)
*B60K 6/365* (2007.10)
*B60K 6/547* (2007.10)
(Continued)

(52) U.S. Cl.
CPC . *B60K 6/547* (2013.01); *B60K 6/48* (2013.01); *B60W 10/08* (2013.01); *B60W 10/111* (2013.01); *B60W 20/00* (2013.01); *B60W 30/19* (2013.01); *F16H 3/095* (2013.01); *F16H 3/126* (2013.01); *F16H 37/046* (2013.01); *B60K 2006/4816* (2013.01); *F16H 2200/0078* (2013.01); *F16H 2200/0095* (2013.01); *Y02T 10/6221* (2013.01); *Y02T 10/6256* (2013.01); *Y10S 903/902* (2013.01); *Y10T 74/19014* (2015.01)

(58) Field of Classification Search
CPC .................................. B60K 6/36; B60K 6/365
See application file for complete search history.

(56) References Cited

U.S. PATENT DOCUMENTS 7,350,430 B2   4/2008   Heinzelmann
7,798,937 B2   9/2010   Gitt
(Continued)

FOREIGN PATENT DOCUMENTS

DE          102 39 396 A1    3/2004
DE    10 2005 020 606 A1   12/2006
(Continued)

OTHER PUBLICATIONS

Machine translation to WO2009135726, Feb. 8, 2016.*
(Continued)

*Primary Examiner* — Tisha Lewis
(74) *Attorney, Agent, or Firm* — Michael J. Bujold; Davis & Bujold, PLLC

(57) ABSTRACT

A drive-train of a vehicle with a hybrid drive comprising an internal combustion engine and an electric machine and an automated group transmission connected between the hybrid drive and a drive axle. The transmission comprises a main transmission having a main shaft, countershafts, and a splitter group connected up upstream from the main transmission. The electric machine is connected to the countershafts. The splitter group and the main transmission have a common direct gear which is engaged by a clutch to support traction force shifting of the main transmission. The clutch connects a transmission input shaft to the main transmission shaft to form the direct gear. While the direct gear is engaged, the connections of the transmission input shaft and the main transmission shaft to the countershaft and the electric machine are separated.

10 Claims, 2 Drawing Sheets

(51) Int. Cl.
*B60K 6/48* (2007.10)
*B60W 10/08* (2006.01)
*B60W 10/111* (2012.01)
*B60W 20/00* (2016.01)
*F16H 3/095* (2006.01)
*F16H 37/04* (2006.01)
*F16H 3/12* (2006.01)
*B60W 30/19* (2012.01)

(56) References Cited

U.S. PATENT DOCUMENTS

| | | |
|---|---|---|
| 2012/0240723 A1 | 9/2012 | Gluckler et al. |
| 2013/0217537 A1* | 8/2013 | Kaltenbach ............ B60K 6/387 477/5 |

FOREIGN PATENT DOCUMENTS

| | | |
|---|---|---|
| DE | 10 2008 001 689 A1 | 11/2009 |
| DE | 10 2009 033 866 A1 | 2/2011 |
| DE | 10 2009 054 752 A1 | 6/2011 |
| WO | 2009/135726 A1 | 11/2009 |

OTHER PUBLICATIONS

German Search Report Corresponding to 10 2012 221 889.0 mailed Aug. 7, 2013.

* cited by examiner

| | AK | EM | S1+R1 | S1+R2 | 20 | S2+R3 | S2+R4 | S3+R5 | S3+R6 | S4 BS | S4 BL |
|---|---|---|---|---|---|---|---|---|---|---|---|
| G1 | • | | • | | | | | • | | | • |
| G2 | • | | | • | | | | • | | | • |
| G3 | • | | • | | | | • | | | | • |
| G4 | • | | | • | | | | • | | | • |
| G5 | • | | • | | | • | | | | | • |
| G6 | • | | | • | | • | | | | | • |
| G6* | • | | | | • | | | | | | • |
| G7 | • | | • | | | | | • | | • | |
| G8 | • | | | • | | | | • | | • | |
| G9 | • | | • | | | | • | | | • | |
| G10 | • | | | • | | | • | | | • | |
| G11 | • | | • | | | • | | | | • | |
| G12 | • | | | • | | • | | | | • | |
| G12* | • | | | | • | | | | | • | |
| GR1 | • | | • | | | | | | • | | • |
| GR2 | • | | | • | | | | | • | | • |
| GR3 | • | | • | | | | | | • | • | |
| GR4 | • | | | • | | | | | • | • | |

Fig. 2

| after \ before | G1 | G2 | G3 | G4 | G5 | G6 | G6* | G7 | G8 | G9 | G10 | G11 | G12 | G12* |
|---|---|---|---|---|---|---|---|---|---|---|---|---|---|---|
| G1 | ▨ | • | | | | | • | | | | | | | |
| G2 | • | ▨ | | | | | • | | | | | | | |
| G3 | | | ▨ | • | | | • | | | | | | | |
| G4 | | | • | ▨ | | | • | | | | | | | |
| G5 | | | | | ▨ | • | • | | | | | | | |
| G6 | | | | | • | ▨ | • | | | | | | | |
| G6* | • | • | • | • | • | • | ▨ | | | | | | | |
| G7 | | | | | | | | ▨ | • | | | | | • |
| G8 | | | | | | | | • | ▨ | | | | | • |
| G9 | | | | | | | | | | ▨ | • | | | • |
| G10 | | | | | | | | | | • | ▨ | | | • |
| G11 | | | | | | | | | | | | ▨ | • | • |
| G12 | | | | | | | | | | | | • | ▨ | • |
| G12* | | | | | | | | • | • | • | • | • | • | ▨ |

Fig. 3

TRACTION SUPPORTED MULTI GROUP TRANSMISSION

This application claims priority from German patent application serial no. 10 2012 221 889.0 filed Nov. 29, 2012.

FIELD OF THE INVENTION

The present invention concerns a drive-train with a hybrid drive and an automated group transmission, and a method for operating the drive-train.

BACKGROUND OF THE INVENTION

It is known especially in the commercial vehicle sector that automated group transmissions are used, which usually consist of a main transmission with an upstream group and/or a downstream group. Preferably, the upstream group is a splitter group which doubles the number of gears of the main transmission. Preferably the downstream group is a range group which provides a larger transmission ratio spread and thus, for example in the case of a two-stage range group in the form of a planetary gear system, can again double the number of gears. For some time it has been sought in such cases to enable the gears in the individual parts of the transmission and also over the transmission as a whole to be shifted with as little traction force interruption as possible or, if possible, to engage the gears without traction force interruption.

Automated group transmissions can also be used in combination with hybrid drive technology. Here too, gear engagement as free from traction force interruption as possible is preferred. For example, from the document DE 10 2009 054 752 A1 by the present applicant such a combination is known. In a drive-train of a motor vehicle with a hybrid drive, namely an internal combustion engine and an electric machine, and an automated group transmission, the electric machine of the hybrid drive is connected to the, or each countershaft. In this way, when a shift is carried out in the splitter group of the group transmission traction force support can be provided. However, only powershifts (supporting gear shifts) for shifts in the splitter group are possible. If the coupling or decoupling of the electric machine and the countershafts are to be shiftable, this is enabled by an additional shifting element which is not needed for the function of the mechanical gear-set.

To minimize the fuel consumption, drive-trains for motor vehicles are often designed such that most of the driving takes place in the direct transmission gear. In the direct transmission gear the force flow is produced by a direct coupling of the drive input shaft to the drive output shaft, which results in greater efficiency. From the document DE 102 39 396 A1 by the present applicant a transmission is known, in which when the direct gear is engaged the parts of the transmission which in the direct gear are not involved in the force flow, are wholly or partially decoupled. In that way frictional losses in those parts of the transmission can be prevented and the efficiency of the transmission is improved. However, in that case no powershifts are possible.

SUMMARY OF THE INVENTION

The purpose of the present invention is to provide a drive-train and a method for operating it, the drive-train comprising a hybrid drive and an automated group transmission, wherein the group transmission can be shifted substantially with traction force support and such that the efficiency of the group transmission and the fuel consumption are improved.

Accordingly a drive-train of a motor vehicle is proposed, which has a hybrid drive comprising an internal combustion engine and an electric machine and with an automated group transmission connected between the hybrid drive and an axle drive, the automated group transmission comprising a main transmission of countershaft configuration with a main shaft and at least one countershaft, an upstream group in particular designed as a splitter group in driving connection upstream from the main transmission, and/or a downstream group in particular designed as a range group in driving connection downstream from the main transmission, wherein the electric machine of the hybrid drive is connected to the, or each countershaft in that the electric machine has a mechanical connection to a first gearwheel plane. According to the invention the splitter group and the main transmission have at least one common, shiftable direct gear through the two transmission portions, the splitter group and the main transmission. With this direct gear, depending on how the downstream group is engaged, various intermediate gears or supporting gears can be engaged. With a two-stage range group, two supporting gears are possible. Thus, shifting processes of the splitter group and the main transmission can be carried out with traction force support.

Accordingly, so long as no change takes place in the range group, a shift can be carried out from any gear to a direct gear with traction force support. Likewise, so long as no change takes place in the range group, a shift can be carried out with traction force support from any direct gear to various other gears. In a preferred embodiment the direct gears have the same gear ratio as the highest engageable gears of the splitter group and the main transmission in the respective shift conditions of the range group.

The direct gear with the input shaft and the main transmission shaft connected is produced by a clutch which is also used to bypass the splitter group and is part of the group transmission. By forming a direct gear, the electric machine is decoupled and no additional shifting elements are needed. The clutch is preferably positioned between the splitter group and the main transmission and can for example be in the form of a claw clutch. While a direct gear is engaged, by virtue of the configuration proposed the countershafts and other components of the main transmission and the splitter group that are not directly involved in the force flow can be decoupled, which improves the efficiency and reduces the fuel consumption.

If it is desired to decouple the electric machine in all the gears, then an additional clutch can optionally be connected between the electric machine and the first gearwheel plane.

In addition a method for operating a drivetrain according to the invention is proposed, wherein when a shift is carried out in the splitter group and/or in the main group, traction force support is provided by the electric machine of the hybrid drive, for which purpose between an original gear and a target gear, a direct gear is engaged in the splitter group and the main transmission as an intermediate gear, and no shift is carried out in the group in driving connection downstream from the main transmission, which in particular is in the form of a range group.

While a direct gear is engaged, operating the electric machine as a generator can actively brake the countershafts and the energy can be used for recuperation.

BRIEF DESCRIPTION OF THE DRAWINGS

To clarify the invention, figures are attached to the description, which are explained in more detail below and which show:

FIG. 2: Shifting logic relating to FIG. 1, in the form of a table

FIG. 3: Shifting matrix relating to FIG. 1, in the form of a table

DETAILED DESCRIPTION OF THE PREFERRED EMBODIMENTS

Figure 1:
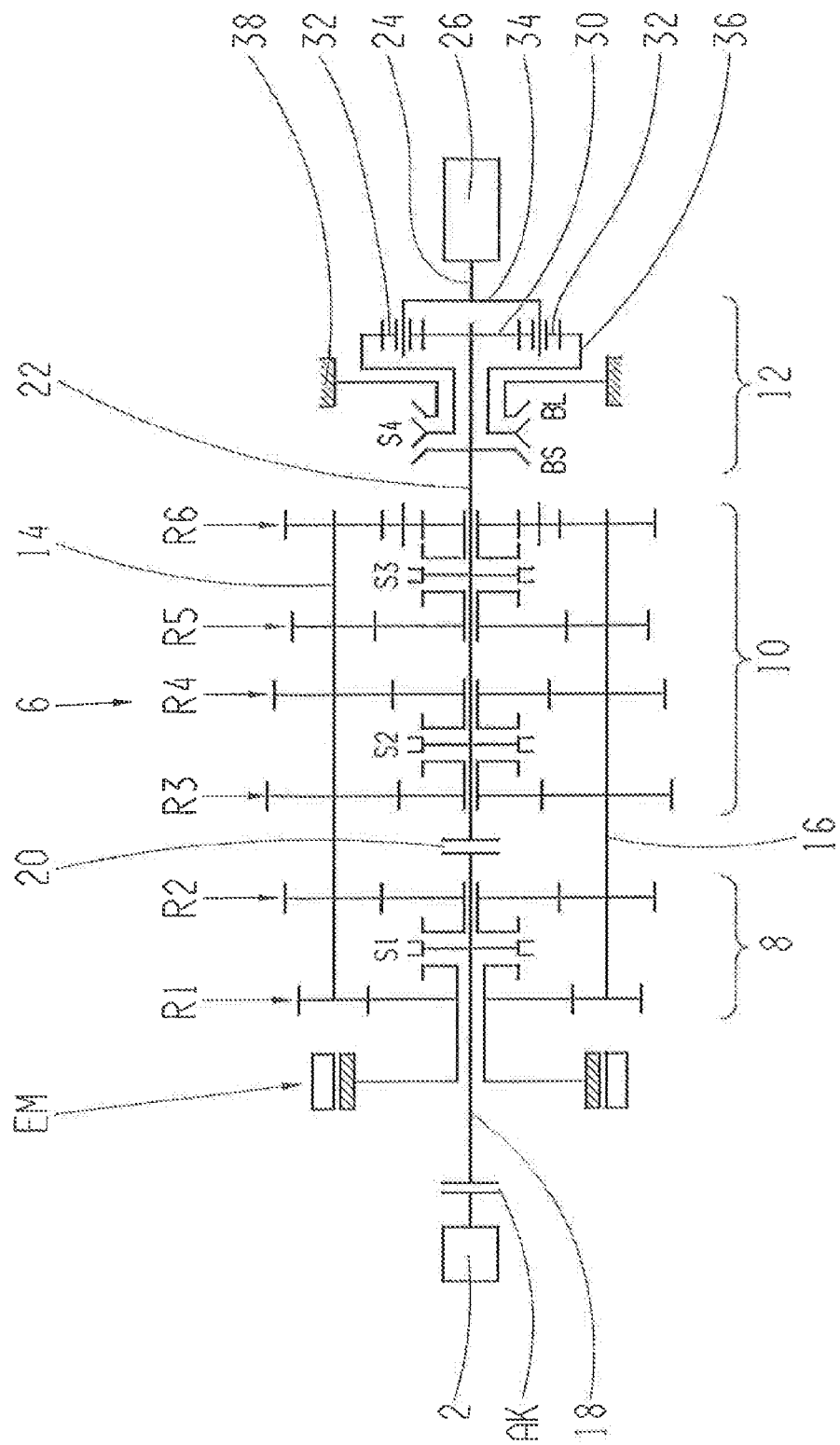
FIG. 1: A drive-train according to the invention

FIG. 1 represents a drive-train according to the invention. The drive-train is powered by a hybrid drive consisting of an internal combustion engine 2 and the electric machine EM. There is also a group transmission 6 that comprises three transmission groups, namely an upstream group in the form of a splitter group 8, the main transmission 10 and a two-stage range group in the form of a planetary gear system 12. The group transmission 6 is of countershaft configuration with two countershafts 14, 16 whose axes extend parallel to one another. Furthermore, the group transmission 6 is connected via a transmission input shaft 18 to the internal combustion engine 2 or can be so connected by means of a starting clutch AK. The transmission input shaft 18 extends through the splitter group 8 and can be connected by a clutch 20 to the main transmission shaft 22 in the main transmission. The clutch 20 only connects the transmission input shaft 18 to the main transmission shaft 22 and is not in contact with other gearwheel planes. This means that no other shift processes can be carried out by the clutch 20. The main transmission shaft 22 connects the main transmission to the range group, in which the main transmission shaft 22 is connected to the sun gear 30 of the planetary gear system 12 in a rotationally fixed manner. The sun gear 30 engages with planetary gearwheels 32 which are connected, via the planetary carrier 34, to a drive output shaft 24. By means of an associated planetary gear system shifting element S4 the planetary gear system 12 can be shifted to two gear ratio stages, a fast stage BS or a slow stage BL. In the fast transmission ratio stage BS, the planetary gear system's shifting element S4 connects the ring gear 36 of the planetary gearset to the transmission input shaft 18. In the slow transmission ratio stage BL, the planetary gear system's shifting element 24 connects the ring gear 36 of the planetary gearset to the transmission housing 38. The drive output shaft 24 connects the group transmission 6 to an axle drive 26. The electric machine EM is positioned on its primary side on the group transmission 6 and is mechanically connected to a first splitter group gearwheel plane. R1. The splitter group 8 has two gearwheel planes R1, R2 and the main transmission 10 has four main transmission gearwheel planes R3, R4, R5, R6. In this case the fourth main transmission gearwheel plane R6 forms the gearwheel plane for the reversing gear. Each gearwheel plane R1, R2, R3, R4, R5, R6 comprises a gearwheel located on the transmission input shaft 18 or the main transmission shaft 22, which is a loose wheel and is in each case connected with a gearwheel on each countershaft 14, 16. Furthermore, a splitter group shifting element S1 is built into the splitter group 8 and forms a connection to the first splitter group gearwheel plane R1 or to the second splitter group gearwheel plane R2. By means of the clutch 20 located between the splitter group 8 and the main transmission 10, the transmission input shaft 18 can be connected to the main transmission shaft 22. The main transmission 10 has two main transmission shifting elements S2, S3. The first main transmission shifting element S2, together with the splitter group 8 and by way of the first main transmission gearwheel plane R3, can engage the fifth gear G5 and the sixth gear G6, and by way of the second main transmission gearwheel plane R4 it can engage the third gear G3 and the fourth gear G4. The second main transmission shifting element R5, together with the splitter group 8 and by way of the third main transmission gearwheel plane R5, can engage the first gear G1 and the second gear G2, and by way of the fourth main transmission gearwheel plane R6 it can engage two reversing gears GR1, GR2. Thus, with the main transmission 10 three forward gears and one reverse gear can be engaged, and by virtue of the splitter group these are doubled so that six forward gears and two reverse gears can be engaged. In addition, by connecting the transmission input shaft 18 to the main transmission shaft 22 a further forward gear in the form of a direct gear can be engaged. By virtue of the two-stage planetary gear system 12, the number of gears can be doubled again, so that twelve forward gears G1-G12 and four reverse gears GR1-GR4, as well as two direct gears G6* and G12* can be engaged.

By designing all the gearwheels of the main transmission 10 on the main transmission shaft 22 and those of the splitter group 8 on the transmission input shaft 18 as loose wheels, the countershafts 14, 16 can be decoupled while a direct gear G6* or G12* is engaged. This reduces losses in the group transmission 6 (for example there are no bearing losses) and at the same time the zero-load losses of the electric machine EM can be decoupled.

According to the invention, the direct gears G6*, G12* are designed such that they can be used as supporting gears and in this example they have the same gear ratios as the sixth gear G6 and the twelfth gear G12, respectively. By connecting the electric machine EM to the countershafts 14, 16 by way of the first splitter gearwheel plane R1 shifts can be made from the first to sixth gears G1, G2, G3, G4, G5, G6 to the direct gear G6* in all cases without traction force interruption and likewise from the seventh to twelfth gears G7, G8, G9, G10, G11, G12 to the direct gear G12*. The same applies in the converse direction. In this way, by following the gear sequence from the currently engaged gear via the intermediate gear, with no change in the range group 12, it is possible to shift to the target gear without a complete interruption of the traction force. The minimum and maximum rotational speed boundary conditions of the drive-train have to be coordinated for this. Thus, a traction force support shift in the splitter group 8 and in the main transmission 10 are made possible. Only a shift in the range group takes place with traction force interruption.

How a corresponding method for traction force support shifting in a drive-train according to the invention as in FIG. 1 can proceed, is shown in FIG. 2. In the form of a table, the figure shows which clutches, shift conditions and which range group positions are active in order to engage a gear. A spot in any cell of the table means that the shift condition is active. As already described, traction force support takes place in the splitter group 8 and in the main transmission 10. First an example will now be explained, namely a traction force supported shift in the splitter group 8. The example concerns a shift from the twelfth gear G12 to the eleventh gear G11. In the initial situation the shifting elements S1, S2, S4 are in the positions for the twelfth gear G12. The second main transmission shifting element S3 is not actuated and is in its neutral position. The internal combustion engine 2 is connected to the transmission input shaft 18 since the starting clutch AK is closed and the torque is transmitted by way of the splitter group shifting element S1 and the second splitter group gearwheel plane R2 to the countershafts 14, 16, from where the first main transmission gearwheel plane R3 transmits the torque, via the first main transmission shifting element S2, to the main transmission shaft 22. The planetary gear system 12 is engaged in the fast BS setting. Now, the gearshift from the twelfth gear G12 to the eleventh gear G11 begins. The electric machine EM delivers power to the countershafts 14, 16. Correspondingly, the torque delivered by the internal combustion engine 2 decreases. The power from the electric machine EM is transmitted by way of the countershafts 14, 16, the first main transmission gearwheel plane R3 and the first main transmission shifting element S2 to the main transmission shaft 22 and via the planetary gear system 12 to the drive output shaft 24. By reducing the torque of the internal combustion engine 2, the splitter group shifting element S1 can be decoupled from the second splitter group gearwheel plane R2 and by controlling the rotation speed and the position of the starting clutch AK, the splitter group shifting element S1 reaches the target speed for coupling to the first splitter group gearwheel plane R1. When the target speed has been reached, the splitter group shifting element S1 is coupled to the first splitter group gearwheel plane R1 and the starting clutch AK is opened. For the eleventh gear G11 to take up the load, the starting clutch AK is closed and the electric machine EM reduces its power output correspondingly. The eleventh gear G11 is engaged, the starting clutch AK is closed and the electric machine EM then co-rotates passively. All shifting processes of the splitter group 8 can be carried out with traction force support in the same way.

With the drive-train according to the invention, traction force supported gearshifts can also be carried out in the main transmission 10. As an example it is described how a traction force supported gearshift from the tenth gear G10 to the direct gear G12* in the fast range group BS is carried out. Initially the starting clutch AK is closed and the tenth gear G10 is engaged. The electric machine EM is co-rotating passively. Now, the gearshift from the tenth gear G10 to the direct gear G12* in the fast range group begins. The electric machine EM builds up motor power and the power output of the internal combustion engine 2 decreases toward zero, so that the splitter group shifting element S1 and the second splitter group gearwheel plane R2 can be decoupled and the splitter group shifting element S1 can be shifted to its neutral position. The vehicle is now being driven purely electrically by the electric machine EM. The coupling to the main transmission shaft 22 and via that to the drive output shaft 24 takes place by way of the countershafts 14, 16, the second main transmission gearwheel plane R4 and the first main transmission shifting element S2 of the tenth gear G10 which was until now engaged in the main transmission 10. The internal combustion engine 2 now increases its rotational speed and brings the transmission input shaft 18 to the target speed, so that the clutch 20 can be closed. The internal combustion engine 2 takes over the propulsion by virtue of its power output and the power of the electric machine EM falls correspondingly, in such manner that no power fluctuations occur. As the torque between the second main transmission gearwheel plane R4 and the first main transmission shifting element S2 passes through zero, the first main transmission shifting element S2 can be shifted to its neutral position. The countershafts 14, 16 and the electric machine EM are now decoupled and run down slowly. The countershafts 14, 16 can also be actively braked by operating the electric machine EM as a generator (for recuperation). The direct gear G12* is now engaged. By analogy with this shifting process, a shift to the direct gear G12* in the fast range group BS can be carried out from any gear G7, G8, G9, G10, G11, G12 in the fast range group BS. A shift from any gear G1, G2, G3, G4, G5, G6 when the range group is engaged in its slow position BL, to the direct gear G6* in the slow range group BL, takes place analogously. Attention must be paid to the rotational speed boundary conditions.

The process for traction force supported shifting can also be carried out from a direct gear G6*, G12*. As an example, a shift from the direct gear G12* in the fast range group BS to the eleventh gear G11 will now be described. Initially, the direct gear G12* in the fast range group BS is engaged. The electric machine EM and the countershafts 14, 16 are at rest. Power is delivered to the drive-train by the internal combustion engine 2. The starting clutch AK is closed. The splitter group shifting element S1 is in its neutral position. Now, the electric machine EM accelerates the countershafts 14, 16 to the target rotational speed, so that the first main transmission shifting element S2 can be engaged. When the target speed has been reached, the first main transmission shifting element S2 is connected to the first main transmission gearwheel plane R3. Once the first main transmission shifting element S2 is connected, the electric machine EM takes over the power demand of the internal combustion engine 2. As the torque of the internal combustion engine 2 passes through zero, the clutch 20 can now be separated. When the clutch 20 is open, the internal combustion engine 2 accelerates the transmission input shaft 18 to the target speed and the splitter group shifting element S1 can then be coupled to the first splitter group gearwheel plane R1. Once the splitter group shifting element S1 has been coupled to the first splitter group gearwheel plane R1, the internal combustion engine 2 resumes supplying power to the drive-train. The power output of the electric machine EM is correspondingly reduced, in such manner that no power peaks/pulses occur. Then, the internal combustion engine 2 takes over the power supply completely and the electric machine EM co-rotates passively.

FIG. 3, in the form of a shifting matrix, again makes clear the traction force support for individual gears. Horizontally, the original gears that can be engaged in a drive-train according to FIG. 1 are shown. Vertically the target gears that can be engaged in a drive-train according to FIG. 1 are shown. By means of spots in the various table cells the table in FIG. 3 indicates from which original gear a traction force supported gearshift to which target gear can be carried out. As already described, this is possible within each of the splitter group settings. In the slow shift position BL of the range group a traction force supported shift of the splitter group is possible from the first gear G1 to the second gear G2 and vice-versa, from the third gear G3 to the fourth gear G4 and vice-versa, and from the fifth gear G5 to the sixth gear G6 and vice-versa. In the fast shift position BS of the range group, traction force supported shifts of the splitter group are possible from the seventh gear G7 to the eighth gear G8 and vice-versa, from the ninth gear G9 to the tenth gear G10 and vice-versa and from the eleventh gear G11 to the twelfth gear G12 and vice-versa. Furthermore, by the intermediate engagement of a supporting gear G6*, G12*, traction force supported shifts in the main transmission are made possible. In the slow shift position BL of the range group, traction force supported shifts are possible from the first to sixth gears G1, G2, G3, G4, G5, G6 to the supporting gear G6* and vice-versa. In the fast shift position BS of the range group, traction force supported shifts are possible from the seventh to twelfth gears G7, G8, G9, G10, G11, G12 to the supporting gear G12* and vice-versa.

INDEXES

2 Internal combustion engine
EM Electric machine
6 Group transmission
8 Splitter group
10 Main transmission
12 Planetary gear system
14 Countershaft
16 Countershaft 18 Transmission input shaft
20 Clutch
22 Main transmission shaft
24 Drive output shaft
26 Axle drive
AK Starting clutch
30 Sun gear
32 Planetary carrier
36 Hollow shaft/Ring gear
38 Transmission housing
R1 First splitter group gearwheel plane
R2 Second splitter group gearwheel plane
R3 First main transmission gearwheel plane
R4 Second main transmission gearwheel plane
R5 Third main transmission gearwheel plane
R6 Fourth main transmission gearwheel plane/Reversing gearwheel plane
S1 Splitter group shifting element
S2 First main transmission shifting element
S3 Second main transmission shifting element
S4 Shifting element of the planetary gear system
G1, G2, G3, G4, G5, G6: Gears one to six of the group transmission, when the range group is shifted to the slow range
G7, G8, G9, G10, G11, G12: Gears seven to twelve of the group transmission, when the range group is shifted to the fast range
G6* Direct gear in the slow setting of the range group/supporting gear
G12* Direct gear in the fast setting of the range group/supporting gear
GR1, GR2: First and second reversing gears when the range group is shifted to the slow range
GR3, GR4: Third and fourth reversing gears when the range group is shifted to the fast range
BS Range group in the fast shift position
BL Range group in the slow shift position

The invention claimed is:

1. A drive-train of a motor vehicle with a hybrid drive comprising:
   an internal combustion engine (2) and an electric machine (EM),
   an automated group transmission (6) connected between the hybrid drive and an axle drive (26), the automated group transmission (6) comprising at least one main transmission (10) of countershaft configuration with a main transmission shaft (22) and at least one countershaft (14, 16),
   at least one upstream group in driving connection upstream from the main transmission (10), and the at least one upstream group is a splitter group (8),
   the electric machine (EM), of the hybrid drive, being continuously, drivingly connected to the at least one countershaft (14, 16),
   the splitter group (8) and the main transmission (10) having at least one common, shiftable direct gear (G6*, G12*) through the splitter group (8) and the main transmission (10) for traction force supported shifting of the main transmission (10), which is engagable with help from the electric machine (EM),
   the group transmission (6) comprising a clutch (20) which is axially arranged between the at least one splitter group (8) and the at least one main transmission (10), the clutch is engagable to directly connect a transmission input shaft (18) to the main transmission shaft (22) to form the at least one direct gear (G6*, G12*), and while the at least one direct gear (G6*, G12*) is engaged, connections of the transmission input shaft (18) and the main transmission shaft (22) to the at least one countershaft (14, 16) and to the electric machine (EM) being separated.

2. The drive-train of a motor vehicle according to claim 1, wherein the drive-train comprises exactly two countershafts (14, 16) that are axially parallel to the main transmission shaft (22), and axially between the at least one splitter group and the at least one main transmission, the main transmission shaft is only connectable to the transmission input shaft.

3. The drive-train of a motor vehicle according to claim 1, wherein the direct gears (G6*, G12*) have a same gear ratio as highest gears (G6, G12) that are engagable in the at least one splitter group (8) and in the at least one main transmission (10).

4. A method of operating drive-train of a motor vehicle having a hybrid drive comprising an internal combustion engine (2) and an electric machine (EM), an automated group transmission (6) connected between the hybrid drive and an axle drive (26), the automated group transmission (6) comprises at least one main transmission (10) of countershaft configuration with a main transmission shaft (22) and at least one countershaft (14, 16) and at least one upstream group in driving connection upstream from the main transmission (10), which is designed as a spotter group (8), the electric machine (EM) of the hybrid drive is connected to the at least one countershaft (14, 16), the splitter group (8) and the main transmission (10) have at least one common, shiftable direct gear (G6*, G12*) through the splitter group (8) and the main transmission (10) for traction force supported shifting of the main transmission (10), which is engagable with help from the electric machine (EM), the group transmission (6) comprises a clutch (20) connected between the at least one splitter group (8) and the at least one main transmission (10) for connecting a transmission input shaft (18) to the main transmission shaft (22) to form the at least one direct gear (G6*, G12*), and while the direct gear (G6*, G12*) is engaged, the connections of the transmission input shaft (18) and the main transmission shaft (22) to the at least one countershaft (14, 16) and to the electric machine (EM) are separated, the method comprising the steps of:
   providing a traction force support, with the electric machine (EM) of the hybrid drive, when a gearshift is carried out in the at least one splitter group (8), and providing a traction force support when a gearshift is carried out in the at least one main transmission (10);
   engaging a direct gear (G6*, G12*), as a supporting gear in the at least one splitter group (8) and the at least one main transmission (10), during a shift from an original gear to a target gear;
   building up motor power of the electric machine (EM) and assuming propulsion with the electric machine by way of the at least one countershaft (14, 16);
   decoupling the internal combustion engine (2) from the main transmission shaft (22); and
   when the internal combustion engine is decoupled from the main transmission shaft (22), adjusting, via the internal combustion engine, the rotational speed of a transmission input shaft (18) to a target speed.

5. The method of operating a drive-train according to claim 4, further comprising the step of reducing the power of the electric machine (EM) until no power fluctuations occur, when in a shifting process with the clutch (20), the internal combustion engine (2) is connected by way of the transmission input shaft (18) to the main transmission shaft (22).

6. The method of operating a drive-train according to claim 4, further comprising the step of decoupling transmission components, not involved in force flow, and the electric machine (EM) by engaging the direct gear (G6*, G12*).

7. The method for operating a drive-train according to claim 4, further comprising the step of carrying out a traction force supported shift from any gear (G1, G2, G3, G4, G5, G6, G7, G8, G9, G10, G11, G12) to a direct gear (G6*, G12*) provided that no change takes place in a range group (12).

8. The method for operating a drive-train according to claim 4, further comprising the step of carrying out a traction force supported shift from any direct gear (G6*, G12*) to any gear (G1, G2, G3, G4, G5, G6, G7, G8, G9, G10, G11, G12) provided that no change takes place in a range group (12).

9. The method for operating a drive-train according to claim 4, further comprising the step of actively braking the at least one countershaft (14, 16), while a direct gear (G6*, G12*) is engaged, by operating the electric machine (EM) as a generator to recoup energy.

10. A drive-train of a motor vehicle, the drive-train comprising
a hybrid drive having an internal combustion engine (2) and an electric machine (EM);
an automated group transmission (6) connected in a power flow between the hybrid drive and an axle drive (26), the automated group transmission (6) comprising at least one main transmission (10) and at least one splitter group (8), the at least one main transmission (10) having a countershaft configuration with a main transmission shaft (22) and at least one countershaft (14, 16), and the at least one splitter group (8) being drivingly coupled to the main transmission (10) and located upstream from the main transmission (10);
the electric machine (EM) being continuously connected to the at least one countershaft (14, 16) of the at least one main transmission (10) such that the electric machine and the at least one countershaft always rotate in common with each other;
the at least one splitter group (8) and the at least one main transmission (10) having at least one common, shiftable direct gear (G6*, G12*) through the two transmission components for the traction force supported shifting of the main transmission (10), the at least one shiftable direct gear being engaged with the help of the electric machine (EM), the group transmission (6) comprising a clutch (20) that is connected between the at least one splitter group (8) and the at least one main transmission (10), the clutch connecting a transmission input shaft (18) to the main transmission shaft (22) to form the at least one direct gear (G6*, G12*), and while the direct gear (G6*, G12*) is engaged, connections of the transmission input shaft (18) and the main transmission shaft (22) to the at least one countershaft (14, 16) and to the electric machine (EM) being separated, and axially between the at least one splitter group and the at least one main transmission, the main transmission shaft is only connectable to the transmission input shaft.

* * * * *